US010731984B2

United States Patent
Chowdhary (10) Patent No.: US 10,731,984 B2
(45) Date of Patent: *Aug. 4, 2020

(54) RECONFIGURABLE SENSOR UNIT FOR ELECTRONIC DEVICE

(71) Applicant: STMicroelectronics, Inc., Coppell, TX (US)

(72) Inventor: Mahesh Chowdhary, San Jose, CA (US)

(73) Assignee: STMicroelectronics, Inc., Coppell, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,091

(22) Filed: Nov. 15, 2019

(65) Prior Publication Data

US 2020/0080843 A1    Mar. 12, 2020

Related U.S. Application Data

(63) Continuation-in-part of application No. 16/284,448, filed on Feb. 25, 2019, now Pat. No. 10,480,941, which is a continuation of application No. 14/749,118, filed on Jun. 24, 2015, now Pat. No. 10,260,877.

(Continued)

(51) Int. Cl.
*G01C 19/32* (2006.01)
*G01C 19/5776* (2012.01)
*G01P 15/18* (2013.01)

(52) U.S. Cl.
CPC ......... *G01C 19/32* (2013.01); *G01C 19/5776* (2013.01); *G01P 15/18* (2013.01)

(58) Field of Classification Search
None
See application file for complete search history.

(56) References Cited

U.S. PATENT DOCUMENTS 10,480,941 B2 * 11/2019 Chowdhary ........... G01C 19/32
2011/0215952 A1    9/2011 Aria et al.
(Continued)

OTHER PUBLICATIONS

Alanezi et al: "Impact of Smartphone Position on Sensor Values and Context Discovery," May 1, 2013 (16 pages).
(Continued)

*Primary Examiner* — Roy Y Yi
(74) *Attorney, Agent, or Firm* — Crowe & Dunlevy (57) ABSTRACT

A sensor chip includes registers storing and outputting configuration data, an extraction circuit receiving digital data and extracting features of the digital data in accordance with the configuration data, and a classification circuit applying a decision tree to the extracted features to generate a context of an electronic device into which the sensor chip is incorporated relative to its surroundings, the decision tree operating according to the configuration data. The classification unit outputs the context to the registers for storage. The configuration data includes which features for the extraction circuit to extract from the digital data, and a structure for the decision tree. The structure for the decision tree includes conditions that the decision tree is to apply to the at least one extracted feature, and outcomes to be effectuated based upon whether the extracted features meet or do not meet the conditions.

28 Claims, 3 Drawing Sheets

Related U.S. Application Data

(60) Provisional application No. 62/121,104, filed on Feb. 26, 2015.

(56) References Cited

U.S. PATENT DOCUMENTS

| | | |
|---|---|---|
| 2014/0201126 A1 | 7/2014 | Ladeh et al. |
| 2015/0039260 A1 | 2/2015 | Niskanen et al. |
| 2015/0062130 A1 | 3/2015 | Ho |

OTHER PUBLICATIONS

First Office Action and Search Report from co-pending CN Appl. No. 201510510921.7 dated Mar. 20, 2018 (8 pages).

Miluzzo, Emiliano et al: "Pocket, Bag, Hand, etc.—Automatically Detecting Phone Context Through Discovery," CS Department, Dartmouth College, Hanover, NH, US, 2011 (5 pages).

Shi, Yue et al: "A Rotation Based Method for Detecting On-Body Positions of Mobile Devices," UbiComp'11, Sep. 17-21, 2011, Beijing, CN, pp. 559-560.

* cited by examiner

RECONFIGURABLE SENSOR UNIT FOR ELECTRONIC DEVICE

PRIORITY CLAIM

This application is a continuation in part of U.S. patent application Ser. No. 16/284,448, filed on Feb. 25, 2019, itself a continuation of U.S. patent application Ser. No. 14/749,118, filed on Jun. 24, 2015, which claims the priority benefit of U.S. Patent Application No. 62/121,104, filed on Feb. 26, 2015, the contents of all of which are hereby incorporated by reference in their entirety to the maximum extent allowable by law.

TECHNICAL FIELD

This disclosure relates to the field of sensors, and more particularly, to reconfigurable sensors for electronic devices.

BACKGROUND

Portable electronic devices such as smartphones, smartwatches, other wearables, and tablets are ever more popular in the world today. Certain functions of these devices depend on the device having knowledge of the device's orientation, or of conditions of the environment in which the device currently resides. For example, a smartphone may rotate its user interface from a portrait view to a landscape view based upon the orientation in which the smartphone is held. As another example, a smartwatch may activate its display or alter the brightness of its display based upon the orientation in which the smartwatch is held, or based upon the light in the environment in which the smartwatch resides, respectively. Such portable electronic devices may also log the physical activity of a user. For example, a smartphone or smartwatch may count the number of steps taken by a user.

In order to determine the orientation of the device or conditions of the environment in which the device resides, sensors such as accelerometers and gyroscopes are employed. Typically, the electronic device includes a system on chip (SOC) that receives raw data from the sensors, and then determines the device orientation or conditions of the environment.

While this approach is effective and enables the electronic device to perform commercially desirable functions, the constant acquisition of data from the sensors by the SOC can result in higher than desirable power consumption. The lowering of power consumption is a continual commercial desire for such electronic devices. Therefore, hardware and techniques for allowing the continual acquisition of the sensor data while reducing power consumption are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a sensor chip includes configuration registers configured to store and output configuration data, an extraction circuit configured to receive digital data and extract at least one feature of the digital data in accordance with the configuration data, and a classification circuit. The classification circuit is configured to apply a decision tree to the at least one extracted feature of the digital data so as to generate a context of an electronic device into which the sensor chip is incorporated relative to its surroundings. The decision tree operates in accordance with the configuration data. The sensor chip also includes data registers, with the classification unit being configured to output the context to the data registers for storage. The configuration data includes which at least one feature for the extraction circuit to extract from the digital data, and a structure for the decision tree. The structure for the decision tree includes at least one condition that the decision tree is to apply to the at least one extracted feature, a first outcome to be effectuated if the at least one extracted feature meets the at least one condition, and a second outcome to be effectuated if the at least one extracted features does not meet the at least one condition.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
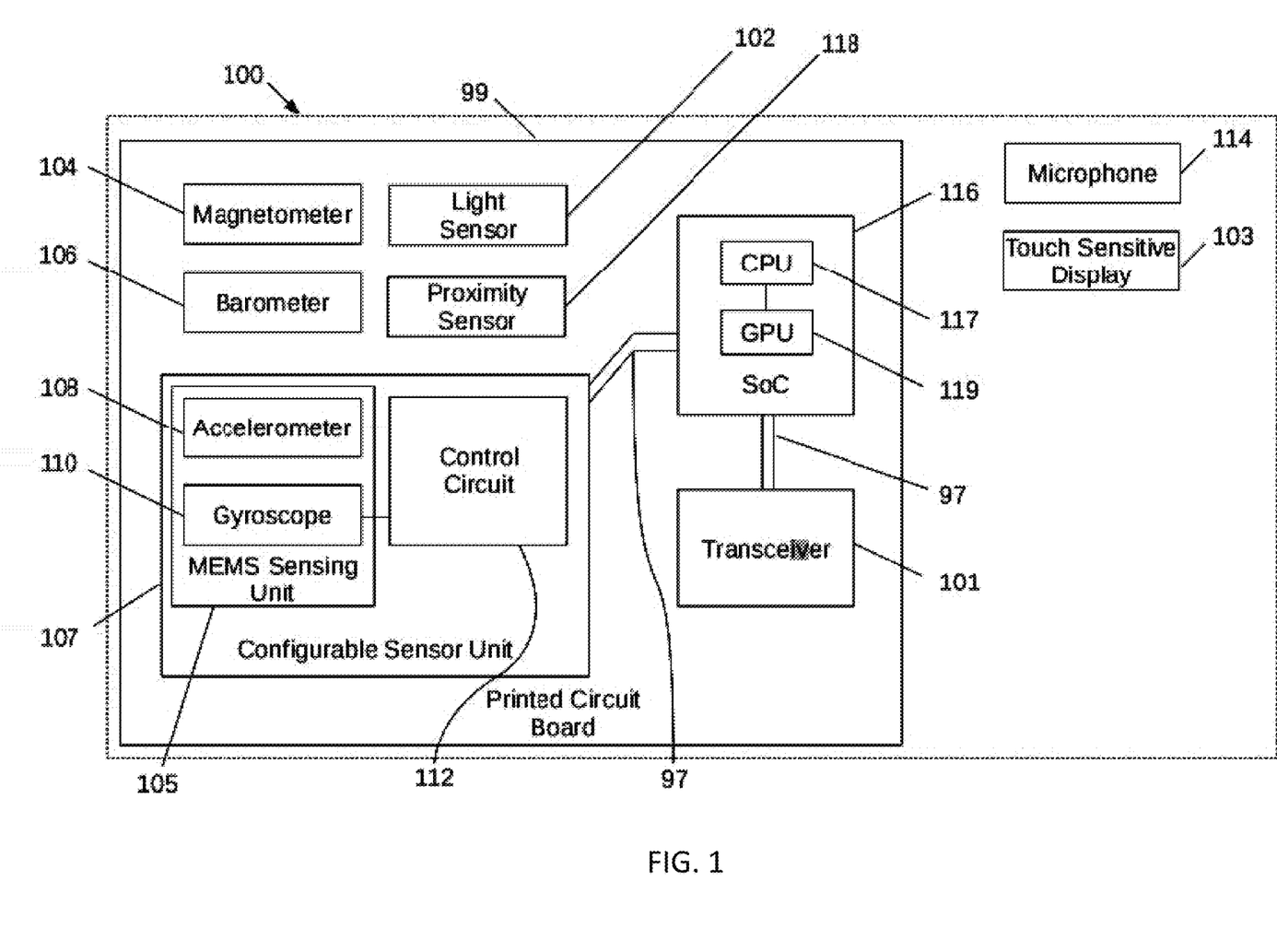
FIG. 1 is a schematic block diagram of an electronic device including a reconfigurable sensor unit in accordance with this disclosure.

With initial reference to FIG. 1, an electronic device 100 is now described. The electronic device 100 may be a smartphone, tablet, smartwatch, or other wearable device. The electronic device 100 includes a printed circuit board (PCB) 99 having various components mounted thereon. Conductive traces 97 printed on the PCB 99 serve to electrically couple the various components together in a desired fashion.

A system on chip (SoC) 116, which comprises a central processing unit (CPU) 117 coupled to a graphics processing unit (GPU) 119, is mounted on the PCB 99. Coupled to the SoC 116 are a transceiver 101 via which the SoC 116 can communicate with remote servers over the Internet, and a touch sensitive display 103 via which the SoC 116 may display output and receive input. A variety of sensors are coupled to the SoC 116, including a light sensor 102 for determining the level of ambient light in the environment in which the electronic device 100 resides, a magnetometer 104 used to determine the orientation of the electronic device 100 with respect to the magnetic field of the Earth, a barometer 106 used to determine the air pressure in the environment (and thus, the altitude of the electronic device 100), a microphone 114 used to detect audible noises in the environment, and a proximity sensor 118 used to determine proximity of the user with respect to the electronic device 100.

A configurable sensor unit 107 is mounted on the PCB 99 spaced apart from the SoC 116, and coupled thereto by the conductive traces 97. The configurable sensor unit 107 includes an accelerometer 108 and/or gyroscope 110 coupled to a control circuit 112. The accelerometer 108 is used for determining accelerations experienced by the electronic device 100, and the gyroscope 110 is used for determining an orientation of the electronic device 100 with respect to the environment. The configurable sensor unit 107 may be formed from discrete components and/or integrated components and/or a combination of discrete components and integrated components, and may be formed as a package.

It should be understood that the configurable sensor unit 107 is not a portion of the SoC 116, and is a separate and distinct component from the SoC 116. Indeed, the sensor unit 107 and the SoC 116 are separate, distinct, mutually exclusive chips mounted on the PCB 99 at different locations and coupled together via the conductive traces 97.

In operation, the SoC 116 may acquire data from the various sensors 102, 103, 104, 106, 114, and 118 at an acquisition rate, and may process the data so as to determine a context of the electronic device 100 relative to its environment. The acquisition rate for these various sensors (with the exception of the touch sensitive display 103) may be relatively low due to the nature of the contexts to be determined from these sensors not necessitating a higher acquisition rate. Therefore, power consumption as a result of acquisition of data from these various sensors may be relatively low. Contexts will be explained below in detail.

On the other hand, the contexts to be determined from the accelerometer 108 and/or the gyroscope 100 may involve the use of a higher acquisition rate than the other sensors. Therefore, the configurable sensor unit 107 is used for data acquisition from the accelerometer 108 and/or the gyroscope 100, as it offers power savings. These power savings are realized by a control circuit 112 of the configurable sensor unit 107 that consumes less power than the SoC 116 performing acquisition of data from the accelerometer 108 and/or the gyroscope 110 and some processing of that data. So as to provide the same level of configurability as would be present were the SoC 116 performing the acquisition and processing of the data from the accelerometer 108 and/or the gyroscope 110, the sensor unit 107 may receive configuration data as input.

In operation, the control circuit 112, as stated, receives the configuration data as input, such as from the I2C bus interface (or via another bus interface, such as SPI or I3C). The control circuit 112 acquires data from the accelerometer 108 and/or the gyroscope 110, and processes the data so as to generate a context of the electronic device 100 relative to its surroundings. This processing is performed by the control circuit 112 using a processing technique operating in accordance with the configuration data received as input. The processed data is then output by the control circuit 112 to the SoC 116 for use thereby.

Figure 2:
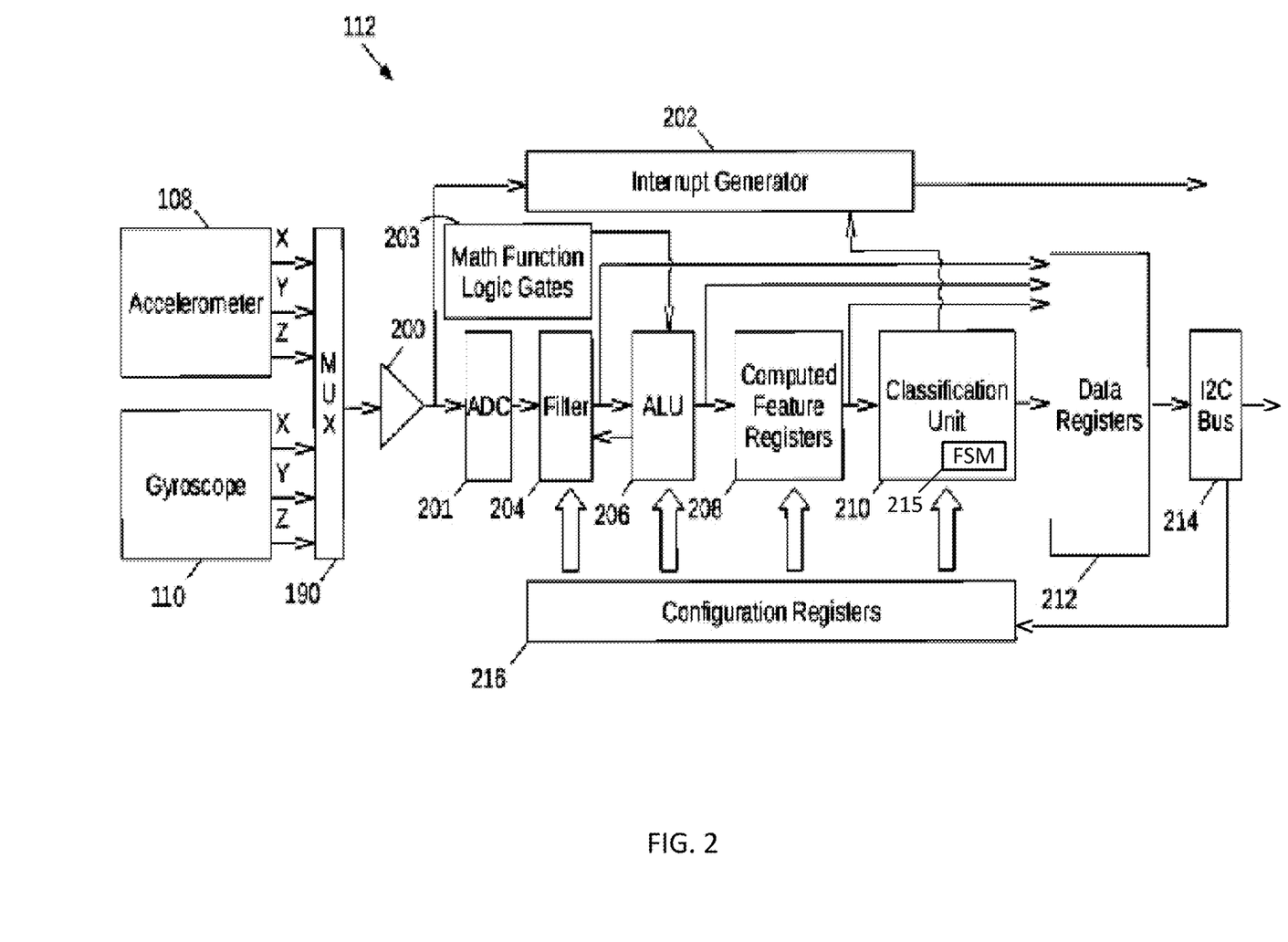
FIG. 2 is a schematic block diagram of the control circuit of the electronic device of FIG. 1.

With additional reference to FIG. 2, sample details of the control circuit 112 are now given. Although specifics will be described, it should be understood that the control circuit 112 may be made from any suitable components, and that any and all such designs are within the scope of this disclosure. It should also be understood that while certain functions and operations are described as being performed by certain components of the control circuit 112, the performance of those functions and operations by any suitable hardware is contemplated and within the scope of this disclosure.

The control circuit 112 includes a multiplexer 190 that receives three dimensional data in the X, Y, and Z directions from the accelerometer 108 and gyroscope 110. The output of the multiplexer 190 is fed to a charge pump 200, which in turn feeds its output to a filter 204. The filter feeds its output to a programmable logic device such as an arithmetic logic unit (ALU) 206, which feeds its output to computed feature registers 208. A classification unit 210 reads data from the computed feature registers 210, and outputs contexts to data registers 212. The data registers 112 are coupled to an I2C bus interface 214. In addition, an interrupt generator 202 is coupled to the output of the charge pump 200, and the output thereof may be read by the SoC 116. Configuration registers 216 are coupled to the I2C bus interface, the filter 204, ALU 206, computed feature registers 208, and classification unit 210. In addition to the connections described above, the outputs of the filter 204, ALU 206, and computed feature registers 208 are also each coupled to the data registers 212.

In operation, the accelerometer 108 and gyroscope 110 each output data for the three spatial dimensions X, Y, Z. This data is received by the multiplexer 190, which selectively multiplexes that data to the charge pump 200. The charge pump 200 outputs that data to the filter 204 which may be an analog or digital filter. The filter 204 filters the data and outputs it to an arithmetic logic unit (ALU) 206.

The ALU 206 serves to extract features of the data itself, such as a mean acceleration over a given period of time, deviance of that mean acceleration, radian acceleration, number of acceleration peaks, number of zero crosses, peak acceleration values, linear acceleration values, energy in bands, mean of roll, pitch, and yaw, variance of roll, pitch, and yaw, mean of linear acceleration, variance of linear acceleration, maximum value of the selected input (e.g., from accelerometer 108 or gyroscope 110) in a defined window of time, minimum value of the selected input in a defined window of time, etc. This list of features that may be extracted from the data is not intended to be exhaustive. Indeed, the ALU 206 may extract any useful features from accelerometer 108 or gyroscope 110 data, and all such features are within the scope of this disclosure. The ALU 206 may also mathematically combine extracted features to produce virtual feature vectors. As an example, extracted features may be a mean of acceleration in the X direction, a mean of acceleration in the Y direction, mean of acceleration in the Z direction, and mean of the norm of acceleration, and a virtual feature vector may be calculated as the sum of the mean of acceleration in the X direction, the mean of acceleration in the Y direction, and the mean of the norm of acceleration. When features or extracted features are referred to below, virtual feature vectors may be used in addition or alternative to the features or extracted features. Therefore, any operation described as being performed on a feature or extracted feature may also be performed on a virtual feature vector.

The computed feature registers 208 store the features extracted by the ALU 206. The classification unit 210 may be a separate ALU, and classifies the context of the electronic device 100 based upon the features extracted by the ALU and stored in the computed feature registers 208. This context may be performed directly from the extracted features, or may be performed, for example, by assigning classifications to the extracted features and then determining the context from the classifications. For example, the context of the electronic device 100 may be where on the user's body it is carried (i.e., in pocket, in hand, in holster), a current method of locomotion of the user (i.e., running, walking, driving, bicycling, climbing stairs), or an orientation of the electronic device 100 with respect to gravity. Another example context may be movement of the electronic device 100 in a gesture, such as a user raising a smartwatch in to a position to view the screen thereof, shaking the electronic device 100, double tapping the touch sensitive display 103 of the electronic device 100, rotating the electronic device 100 either clockwise or counterclockwise, and swiping the touch sensitive display 103 to the left, right, top, or bottom.

The contexts classified by the classification unit 210 are then stored in the data registers 212, and may in turn be read out by the I2C bus 214 to the SoC 116. The SoC 116 then uses the classified contexts in its operations. The interrupt generator 202 serves to generate interrupts for the SoC 116 so as to facilitate communication between the configurable sensing unit 107 and the SoC 116.

In some applications, the multiplexer 190 may receive additional data from the SoC 116. For example, the SoC 116 may send additional data from the light sensor 102, magnetometer 104, barometer 106, microphone 114, proximity sensor 118, or touch sensitive display 103 to the multiplexer 190, such that this data may be used by the other components of the sensor unit 107.

The described functionalities of the filter 204, ALU 206, and classification unit 210 operate in accordance with configuration data stored in the configuration registers 216. For example, the configuration data may be changeable parameters of the processing technique performed by the control circuit 112. Thus, the configuration data may change the pre-processing performed by the control circuit 112 by either replacing the filtering technique performed by the filter 204, or by replacing the values of the coefficients of the filter 204.

The configuration data may change the performance level of the sensor unit 107 by altering the balance between latency, accuracy, and power consumption. This balance may be changed by altering the acquisition rate of the data, and thus the rate at which the multiplexer 190 switches from among its various inputs. This balance may also be changed by altering the range of accepted values of the data, for example by the ALU 206 ignoring data outside of the range of accepted values when extracting or computing features of the data.

The configuration data may change the techniques used by the ALU 206 to extract and compute the features from the data. The ALU 206 may be programmed to extract and compute a plurality of features from the data, and the configuration data may serve to select a subset of that plurality of features for the ALU 206 to actually extract and compute. In some cases, the configuration data may program or reprogram the ALU 206 for extracting and computing different features and/or virtual feature vectors. The configuration data may also program or reprogram the way in which the ALU 206 extracts and computes any of the features.

The balance between latency, accuracy, and power consumption may also be altered by the configuration data switching operation of the sensor unit 107 between a lower power consumption mode and a higher power consumption mode. In the lower power consumption mode, the ALU 206 extracts and computes a smaller subset of features of the plurality of features which the ALU 206 is programmed to extract and compute, whereas in the higher power consumption mode, the ALU 206 extracts and computes a larger subset (or all) of the features of the plurality of features which the ALU 206 is programmed to extract and compute. When these lower and higher power consumption modes are used, the sensor unit 107 operates in the lower power consumption mode until features of a threshold value or values are extracted by the ALU 206, at which point the sensor unit 107 switches to operation in the higher power consumption mode.

The configuration data may change the techniques used by the classification unit 210 for classifying the features extracted and computed by the ALU 206 and stored in the computed feature registers 208 into contexts, for example by using a decision tree.

The classification unit 210 may be programmed to classify the features into a plurality of contexts, and the configuration data may select a subset of that plurality of contexts for the classification unit 210 to classify. In addition, the configuration data may program or reprogram the classification unit 210 for classifying and determining different contexts. The configuration data may also program or reprogram the way in which the classification unit 210 classifies and determines the different contexts, for example using a decision tree.

Figure 3A:
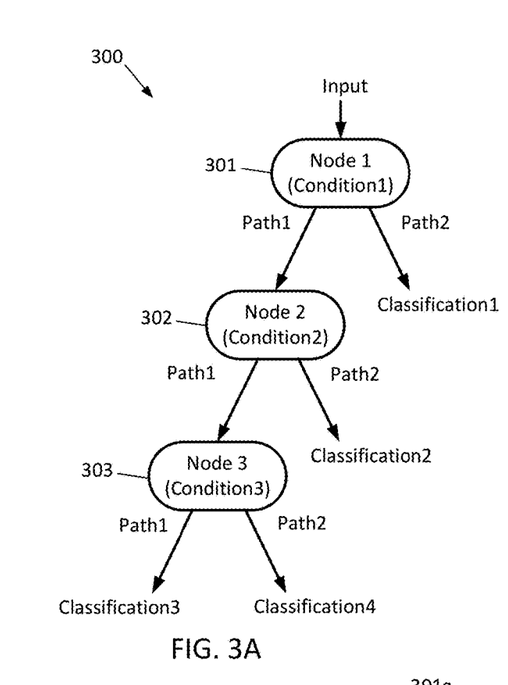
FIG. 3A is a diagram of the format of a sample decision tree such as may be used by the classification unit of FIG. 2 to classify extracted features.

A decision tree is a connection of nodes, as shown in FIG. 3A, where there are three node 301-303. Each node receives an input value, with node 301 receiving the input to the input tree 300. Each node checks if its input meets a condition for that node (for example, whether the input value is greater than or less than a threshold value), and then advances along one of two paths depending upon the outcome of the comparison. Each path can lead to another node, or can lead to the end of the tree and an output classification or context. In some instances, a single decision tree can be used to determine the context of the electronic device 100 relative to its surroundings from the extracted features (used as input values to the decision tree), while in other instances, multiple decision trees may be used. When multiple decision trees are used, a first decision tree is used to determine classifications from the extracted features, and then a second decision tree is used to determine the context of the electronic device 100 relative to its surroundings from the classifications. This classification made by the first decision tree may be of a single input value, or may be multiple classifications of multiple input values, with the number of times each classification is reached being summed, so that the second decision tree may utilize one or more of these classification sums as its input.

For example, with reference to node 301, if Condition1 is met (for example, if Input>Threshold1), then the second path is taken and the input value receives a first classification (e.g., has a first step intensity). If Condition1 is not met (for example, if Input<Threshold1), then the first path is taken and the tree proceeds to node 302. Here, if Condition2 is met (for example, if Input>Threshold2, with Threshold2<Threshold1), then the second path is taken and the input value receives a second classification (e.g., has a second step intensity). If Condition2 is not met (for example, if Input<Threshold2), then the first path is taken and the tree proceeds to node 303. Here, if Condition3 is met (for example, if Input>Threshold3, with Threshold3<Threshold2), then the second path is taken and the input value receives a fourth classification (e.g., has a fourth step intensity). If Condition3 is not met (for example, if Input<Threshold3), then the first path is taken and the input value receives a third classification (e.g., has a third step intensity).

Note that the classifications may be flags, or may be counters, with the respective counter incrementing each time the decision tree reaches that context for a new input value within the same input window. From the classification flags or counters, the context of the electronic device 100 relative to its surroundings may be determined, for example using another decision tree as described above. Also, the classifications themselves may be provided to the data registers 212 as the output of the classification unit 210, for communication over the I2C bus 214 to another component (such as the SoC 116) for further processing by a high level application for deriving a high or meta level context of the electronic device 100 relative to its surroundings.

In still other instances, a single decision tree may be used to determine classifications from the extracted features, and then a finite state machine (FSM) 215 within the classification unit 210 may determine the context of the electronic device 100 relative to its surroundings from the classifications determined by the output of the decision tree. As an alternative to this, in another instance where a single decision tree is used, a node (or nodes) of the decision tree may contain a link to the FSM 215, so that if the path through the decision tree reaches that node, the FSM 215 determines the context of the electronic device 100 relative to its surroundings.

In yet another instance, two decision trees may be used together with a FSM 215. In this case, the first decision tree is used to determine classifications from the extracted features, and the second decision tree is used to determine the context of the electronic device 100 relative to its surroundings, with a node (or nodes) of the second decision tree containing a link to the FSM 215 so that if the path through the second decision tree reaches that node, the FSM 215 determines the context of the electronic device 100 relative to its surroundings.

As will be understood by those of skill in the art, the FSM 215 is defined by a list of states between start and stop conditions which can be transitioned between based upon defined conditions or triggers. This makes the use of the FSM 215 useful in cases where it is desired to determine if the context is an event, such as a gesture.

In some cases, meta-classifiers 217 in the classification unit 210 may be applied to classification output determined by a decision tree to determine the context of the electronic device 100 relative to its surroundings. A meta-classifier 217 applies conditions to the classification output. A sample meta-classifier 217 is shown below, assuming a case where the decision tree outputs either A (Classifier1) or B (Classifier2) in each iteration (for each input data the decision tree receives), and where Counter A (Classifier1Sum) and Counter B (Classifier2Sum) represent the total number of times the decision tree has respectively output A (Classifier1) and B (Classifier2).

meta-classifier 217 provides no output. Next, as can be seen in the meta-classifier 217 if Counter A is equal to or greater than 3, the meta-classifier 217 outputs A; and if Counter B is equal to or greater than 4, the meta-classifier 217 outputs B.

As can also be see in the meta-classifier 217, if the sum of Counter A and Counter B is equal to the given value (which is 3 in this example) but less than 4, then regardless of the values of Counter A and Counter B, the meta-classifier 217 outputs A. On the other hand, if the sum of Counter A and Counter B is equal to or greater than 4, but Counter A is not equal to 3 and Counter B is not equal to 4, the meta-classifier 217 outputs B.

The purpose of the use of the meta-classifiers is to reduce the possibility of false positives in context output.

As another example of meta-classifier use, a meta-classifier may be applied to the classifier sums output by a first decision tree to determine filtered classifier sums. From the filtered classifier sums, a second decision tree, FSM 215, or second meta-classifier may determine the context of the electronic device 100 relative to its surroundings. Note that here, the second decision tree may contain a node that links to the FSM 215 for determination of the context if the decision tree proceeds to that node.

Figure 3B:
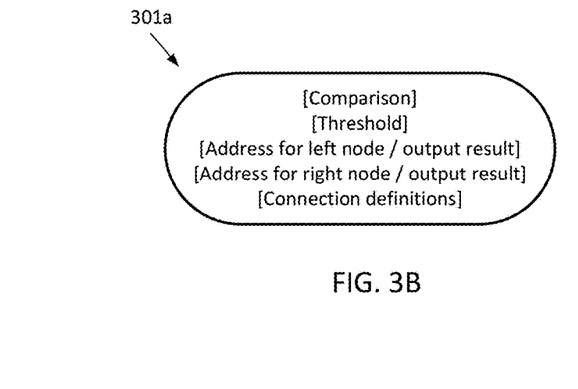
FIG. 3B illustrates the data structure of each leaf of the sample decision tree of FIG. 3A.

The decision tree may be saved inside a memory within the classification unit 210, or may be saved within the configuration registers 216. The data structure for each node is shown in FIG. 3B, where a sample node 301a is shown. The sample node 301a includes a comparison field, threshold field, first address field, second address field, and connection definition field.

The comparison field indicates the type of comparison to be performed in order to determine whether the condition is met. The comparison field may be single bit, for example with a binary "0" indicating that the comparison to be performed is whether the input value is greater than a threshold, and a binary "1" indicating that the comparison to be performed is whether the input value is less than the threshold. The threshold field contains the threshold value to be used in the comparison, and may be a 16 bit field expressed in 16 bit half precision floating point.

The first address field contains either the address of the node that the tree is to advance to when the first condition is met/not met, or the result to be output (e.g., first step intensity, second step intensity, etc.) when the first condition is met/not met. The second address field contains either the address of the node that the tree is to advance to when the first condition is met/not met, or the result to be output when the second condition is met/not met. The first and second address fields may be, for example, 9 bits.

The connection definition field defines whether the nodes that the first and second address fields point to, are leaf nodes or non-leaf nodes. A leaf node does not branch, meaning that

| Decision Tree Result | A | A | A | B | A | B | B | B | A | B | B | B | A | A | A |
|---|---|---|---|---|---|---|---|---|---|---|---|---|---|---|---|
| Counter A | 1 | 2 | 3 | 2 | 3 | 2 | 1 | 0 | 1 | 0 | 0 | 0 | 1 | 2 | 3 |
| Counter B | 0 | 0 | 0 | 1 | 0 | 1 | 2 | 3 | 2 | 3 | 4 | 5 | 4 | 3 | 2 |
| Meta-Classifier Result | X | X | A | A | A | A | A | A | A | A | B | B | B | B | A |

Here, the decision tree is used over a window of 15 samples (input values) to determine the context of the electronic device 100 relative to its surroundings. This meta-classifier 217 is set to provide an output if the sum of Counter A and Counter B equals a given value, which here is 3. Therefore, notice that in the first two cases (Counter A=1, Counter B=0; and Counter A=2, Counter B=0), the when an address field contains the result to be output, that result is a leaf node. A non-leaf node branches, meaning that when an address field contains the address of the node that the tree is to advance to, that node is a non-leaf node. In FIG. 3A, the leaf nodes are "Classification1", "Classification2", "Classification3", and "Classification4", while the non-leaf nodes are 301, 302, and 303. The connection definition field may contain two bits, for example with a "00" meaning that both the first and second addresses point to non-leaf nodes, "01" meaning that the first address points to a non-leaf node while the second address points to a leaf node, "10" meaning that the first address points to a leaf node while the second address points to a non-leaf node, and "11" meaning that the first and second addresses both point to leaf nodes.

The decision tree may be transmitted to the memory within the classification unit 210, or transmitted to the configuration registers 216, via the I2C bus 214. In particular, each node of the decision tree and its associated comparison field, threshold field, first address field, second address field, and connection definition field may be transmitted to the memory within the classification unit 210, or transmitted to the configuration registers 216, via the I2C bus 214. Further details of the techniques that may be used to program the configuration registers 216 with the configuration data, including the decision tree or decision trees and their associated components described above, may be found in U.S. Pat. No. 10,142,789, the contents of which are herein incorporated by reference in their entirety.

Figure 3C:
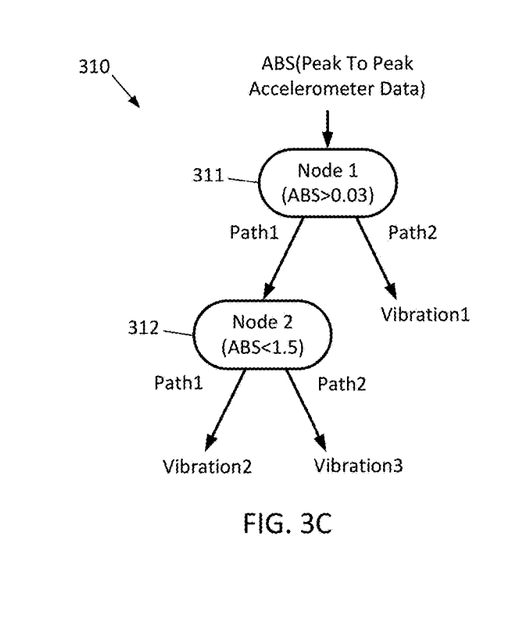
FIG. 3C is a diagram of a sample decision tree such as may be used by the classification unit of FIG. 2 to classify extracted features.

A sample decision tree 310 is shown in FIG. 3C which is used to classify extracted features (a window of 16 samples of absolute value peak to peak accelerometer data) into classifications (the level of vibration intensity), and includes two non-leaf nodes 311 and 312. As stated, the input to the decision tree 310 is a window of 16 samples of absolute value of peak to peak accelerometer data. If at node 311, a given sample is less than 0.03, then the second path is followed and ends at the Vibration1 leaf, meaning that the given sample is assigned the classification of Vibration1. If the given sample is greater than 0.03, then the first path is followed to node 312. If at node 312, the given sample is greater than 1.5, then the second path is followed and ends at the Vibration3 leaf, meaning that the given sample is assigned the classification of Vibration3. If the given sample is less than 1.5, then the first path is followed and ends at the Vibration2 leaf, meaning that the given sample is assigned the classification of Vibration2. Counts of the number of occurrences of each classification for the 16 sample window may be taken, and from these counts, the context of the electronic device 100 relative to its surroundings may be determined.

The decision tree may be received by the memory within the classification unit 210, or by the configuration registers 216, from the I2C bus interface (or via another bus interface, such as SPI or I3C).

The classified features determined by the classification unit 210 may be stored in the data registers 212, and may be the contexts determined by the classification unit 210.

The SoC 116 may receive additional or new configuration data from the transceiver 101, and it may then pass this additional or new configuration data to the configuration registers 216. In some instances, the SoC 116 may generate the additional or new configuration data itself, for example based upon user input, and then pass the additional or new configuration data to the configuration registers 216.

It should be understood that the configuration data stored in the configuration registers 216 may operate on the various components in a variety of ways. For example, the configuration data may directly provide the techniques or algorithms used by the various components, may select which pre-programmed techniques or algorithms are to be used, may provide the coefficients used by the techniques or algorithms, or may replace standard techniques, algorithms, or coefficients. Thus, the various components may operate in a first fashion in the absence of the configuration data, and in a second fashion in the presence of the configuration data. The configuration registers 216 are reprogrammable on the fly by the SoC 116, and thus the alteration of the operation of the sensor unit 107 may not involve the changing of firmware. Therefore, the various components may be considered to be fully programmed at a first point in time, and that programming may be changed by the configuration data at a second point in time.

In addition to the power savings provided by this sensor unit 107, the sensor unit 107 facilitates easier manufacture of electronic devices 100. Due to the configuration data being easily changeable in the configuration registers 116, different sensor units 107 need not be stocked by a manufacturer for different electronic devices 100. The same design of sensor unit 107 may be used by a manufacturer for different electronic devices 100, with differences in the configuration data stored in the configuration registers 116 of each, thereby easing manufacturing supply chain constraints.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A sensor chip comprising:
configuration registers configured to store and output configuration data;
an extraction circuit configured to receive digital data and extract at least one feature of the digital data in accordance with the configuration data;
a classification circuit configured to apply a decision tree to the at least one extracted feature of the digital data so as to generate a context of an electronic device into which the sensor chip is incorporated relative to its surroundings, the decision tree operating in accordance with the configuration data; and
data registers, wherein the classification circuit is configured to output the context to the data registers for storage;
wherein the configuration data identifies which at least one feature for the extraction circuit to extract from the digital data, and a structure for the decision tree; and
wherein the structure for the decision tree includes at least one condition that the decision tree is to apply to the at least one extracted feature, a first outcome to be effectuated if the at least one extracted feature meets the at least one condition, and a second outcome to be effectuated if the at least one extracted feature does not meet the at least one condition.

2. The sensor chip comprising:
configuration registers configured to store and output configuration data;
an extraction circuit configured to receive digital data and extract at least one feature of the digital data in accordance with the configuration data;
a classification circuit configured to apply a decision tree to the at least one extracted feature of the digital data so as to generate a context of an electronic device into which the sensor chip is incorporated relative to its surroundings, the decision tree operating in accordance with the configuration data; and
data registers, wherein the classification circuit is configured to output the context to the data registers for storage;

wherein the configuration data identifies which at least one feature for the extraction circuit to extract from the digital data, and a structure for the decision tree;

wherein the structure for the decision tree includes at least one condition that the decision tree is to apply to the at least one extracted feature, a first outcome to be effectuated if the at least one extracted feature meets the at least one condition, and a second outcome to be effectuated if the at least one extracted feature does not meet the at least one condition;

wherein the structure for the decision tree is comprised of a plurality of nodes, with at least one node of the plurality of nodes being a non-leaf node, and with at least two nodes of the plurality of nodes being leaf nodes;

wherein each non-leaf node includes a respective condition that the decision tree is to apply to the at least one extracted feature, a first outcome to be effectuated if the at least one extracted feature meets that condition, and a second outcome to be effectuated if the at least one extracted feature does not meet that condition; and wherein at least one of the first and second outcomes is for the decision tree applied by the classification circuit to proceed to one of the leaf nodes.

3. The sensor chip of claim 2, wherein each leaf node contains a potential context of the electronic device into which the sensor chip is incorporated relative to its surroundings; and when the decision tree proceeds to one of the leaf nodes, the potential context contained in that leaf node is output by the classification circuit as the context of the electronic device into which the sensor chip is incorporated relative to its surroundings.

4. The sensor chip of claim 2, wherein at least one leaf node contains a link to a finite state machine; and when the decision tree proceeds to the leaf node containing the link to the finite state machine, the finite state machine determines the context of the electronic device into which the sensor chip is incorporated relative to its surroundings based upon a path taken through the decision tree and the at least one extracted feature.

5. The sensor chip of claim 2, wherein each leaf node contains a potential classification of the at least one extracted feature; and when the decision tree proceeds to one of the leaf nodes, a counter for the potential classification contained in that leaf node is incremented.

6. The sensor chip of claim 5, wherein the classification circuit is further configured to apply a meta-classifier to the counter for the potential classification to determine the context of the electronic device into which the sensor chip is incorporated relative to its surroundings.

7. The sensor chip of claim 5, wherein the classification circuit is further configured to apply a second decision tree to the counter for the potential classification to determine the context of the electronic device into which the sensor chip is incorporated relative to its surroundings.

8. The sensor chip of claim 5, wherein the classification circuit is configured to use a finite state machine to determine the context of the electronic device into which the sensor chip is incorporated relative to its surroundings from the counter for the potential classification.

9. The sensor chip of claim 5, wherein the classification circuit is further configured to apply a meta-classifier to the counter for the potential classification to produce a filtered counter for the potential classifier.

10. The sensor chip of claim 9, wherein the classification circuit is further configured to apply a meta-classifier to the filtered counter for the potential classification to determine the context of the electronic device into which the sensor chip is incorporated relative to its surroundings.

11. The sensor chip of claim 9, wherein the classification circuit is further configured to apply a second decision tree to the filtered counter for the potential classification to determine the context of the electronic device into which the sensor chip is incorporated relative to its surroundings.

12. The sensor chip of claim 9, wherein the classification circuit is configured to use a finite state machine to determine the context of the electronic device into which the sensor chip is incorporated relative to its surroundings from the filtered counter for the potential classification.

13. The sensor chip of claim 2, wherein at least one of the first and second outcomes is for the decision tree to proceed to a subsequent non-leaf node.

14. The sensor chip of claim 2, wherein the sensor chip includes a data interface for communication with at least one other component of the electronic device into which the sensor chip is incorporated; and wherein the configuration data is received by the configuration registers from the at least one other component over the data interface.

15. The sensor chip of claim 2, wherein the at least one feature of the digital data comprises a plurality of feature vectors of the digital data; wherein the extraction circuit is further configured to generate at least one feature vector by mathematically combining at least some of the plurality of feature vectors of the digital data; and wherein the classification circuit applies the decision tree to the at least one feature vector.

16. The sensor chip of claim 2, wherein the at least one feature of the digital data comprises at least one of mean acceleration, radian acceleration, number of acceleration peaks, number of zero crosses, peak acceleration values, linear acceleration values, energy in bands, mean of roll, pitch, and yaw, variance of roll, pitch, and yaw, mean of linear acceleration, variance of linear acceleration.

17. The sensor chip of claim 2, wherein the context of the electronic device relative to its surroundings comprises at least one of a mode of locomotion of a user carrying the electronic device, a position of the electronic device on a body of the user, and a gesture in which the electronic device has been moved.

18. A method comprising:

a) receiving digital data and extracting at least one feature of the digital data in accordance with configuration data to produce a sample;

b) applying a decision tree to the sample so as to determine a classification for the sample from a plurality of different possible classifications, the decision tree operating in accordance with the configuration data;

wherein the configuration data identifies which at least one feature to extract from the digital data, and a structure for the decision tree;

wherein the structure for the decision tree includes at least one condition that the decision tree is to apply to the at least one extracted feature, a first outcome to be effectuated if the at least one extracted feature meets the at least one condition, and a second outcome to be effectuated if the at least one extracted feature does not meet the at least one condition;

c) repeating a) and b) for each sample, with a counter for each determined classification being incremented when that classification is determined for a corresponding sample; and d) determining a context of an electronic device performing steps a), b), c), and d) relative to its surroundings from the counters for each different possible classification.

19. The method of claim 18, wherein the context of the electronic device is determined by applying a second decision tree to the counters for each different possible classification.

20. The method of claim 18, wherein the context of the electronic device is determined from the counters for each different possible classification using a finite state machine.

21. The method of claim 18, wherein the context of the electronic device is determined by applying a meta-classifier to the counters for each different possible classification.

22. The method of claim 18, wherein the context of the electronic device is determined by applying a meta-classifier to the counters for each different possible classification to produce filtered counts, and then applying a meta-classifier to the filtered counts.

23. The method of claim 18, wherein the context of the electronic device is determined by applying a meta-classifier to the counters for each different possible classification to produce filtered counts, and then applying a second decision tree to the filtered counts.

24. The method of claim 18, wherein the context of the electronic device is determined by applying a meta-classifier to the counters for each different possible classification to produce filtered counts, and then using a finite state machine to determine the context of the electronic device from the filtered counts.

25. The sensor chip of claim 1, wherein the sensor chip includes a data interface for communication with at least one other component of the electronic device into which the sensor chip is incorporated; and wherein the configuration data is received by the configuration registers from the at least one other component over the data interface.

26. The sensor chip of claim 1, wherein the at least one feature of the digital data comprises a plurality of feature vectors of the digital data; wherein the extraction circuit is further configured to generate at least one feature vector by mathematically combining at least some of the plurality of feature vectors of the digital data; and wherein the classification circuit applies the decision tree to the at least one feature vector.

27. The sensor chip of claim 1, wherein the at least one feature of the digital data comprises at least one of mean acceleration, radian acceleration, number of acceleration peaks, number of zero crosses, peak acceleration values, linear acceleration values, energy in bands, mean of roll, pitch, and yaw, variance of roll, pitch, and yaw, mean of linear acceleration, variance of linear acceleration.

28. The sensor chip of claim 1, wherein the context of the electronic device relative to its surroundings comprises at least one of a mode of locomotion of a user carrying the electronic device, a position of the electronic device on a body of the user, and a gesture in which the electronic device has been moved.

* * * * *